(12) United States Patent
Koike et al.

(10) Patent No.: US 8,284,343 B2
(45) Date of Patent: Oct. 9, 2012

(54) FRAME STRUCTURE AND DISPLAY EQUIPPED WITH THE SAME

(75) Inventors: Eiji Koike, Osaka (JP); Takafumi Tobi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 342 days.

(21) Appl. No.: 12/668,870

(22) PCT Filed: Jul. 1, 2008

(86) PCT No.: PCT/JP2008/001725
§ 371 (c)(1),
(2), (4) Date: Jan. 12, 2010

(87) PCT Pub. No.: WO2009/034670
PCT Pub. Date: Mar. 19, 2009

(65) Prior Publication Data
US 2010/0188597 A1   Jul. 29, 2010

(30) Foreign Application Priority Data
Sep. 14, 2007   (JP) ................................. 2007-239371

(51) Int. Cl.
*G02F 1/1333* (2006.01)
(52) U.S. Cl. ................ 349/58; 349/56; 349/60
(58) Field of Classification Search ............ 349/56, 349/58, 60
See application file for complete search history.

(56) References Cited

U.S. PATENT DOCUMENTS

| | | | |
|---|---|---|---|
| 7,697,271 B2 * | 4/2010 | Kuo et al. ................ 361/679.21 |
| 2001/0052963 A1 | 12/2001 | Hashizume et al. |
| 2003/0030765 A1 | 2/2003 | Hayashi et al. |
| 2003/0214494 A1 | 11/2003 | Morishita et al. |
| 2003/0223215 A1 | 12/2003 | Shin et al. |

(Continued)

FOREIGN PATENT DOCUMENTS

JP   8-114788 A   5/1996

(Continued)

OTHER PUBLICATIONS

English computer translation for JP-2005-275076-A dated Oct. 6, 2005.

(Continued)

*Primary Examiner* — Jennifer Doan
(74) *Attorney, Agent, or Firm* — Birch, Stewart, Kolasch, Birch, LLP

(57) ABSTRACT

In a frame structure configured so that front and rear frames 10, 30 are attached to an intermediate frame 20, the strength of each frame 10, 30 can be easily ensured, and the front frame 10 or the rear frame 30 can be prevented from being easily removed from the intermediate frame 20 when subjected to a large impact force.

The front and rear frames 10, 30 are provided so that respective side face portions 12, 32 thereof overlap each other, and a plurality of protrusions 21 are provided on a side face of the intermediate frame 20. The frame 10 (30), whose side face portion 12 (32) is positioned on a laterally inner side, is attached to the intermediate frame 20 by latching engaging portions 13 (33), provided in the side face portion 12 (32), by the protrusions 21, respectively. On the other hand, the frame 30 (10), whose side face portion 32 (12) is positioned on a laterally outer side, is attached to the intermediate frame 20 by latching engaging portions 33 (13), provided in the side face portion 32 (12), by the protrusions 21, respectively.

8 Claims, 16 Drawing Sheets

U.S. PATENT DOCUMENTS

| | | |
|---|---|---|
| 2005/0213924 A1 | 9/2005 | Sakurai et al. |
| 2007/0064173 A1* | 3/2007 | Chiu et al. .................... 349/69 |
| 2007/0132908 A1 | 6/2007 | Kim et al. |

FOREIGN PATENT DOCUMENTS

| | | |
|---|---|---|
| JP | 9-197383 A | 7/1997 |
| JP | 10-206831 A | 8/1998 |
| JP | 11-126034 A | 5/1999 |
| JP | 11-231290 A | 8/1999 |
| JP | 11-242447 A | 9/1999 |
| JP | 2000-29004 A | 1/2000 |
| JP | 2000-258756 A | 9/2000 |
| JP | 2002-40394 A | 2/2002 |
| JP | 2003-91340 A | 3/2003 |
| JP | 2003-114417 A | 4/2003 |
| JP | 2003-166513 A | 6/2003 |
| JP | 2003-279934 A | 10/2003 |
| JP | 2003-346533 A | 12/2003 |
| JP | 2005-275076 A | 10/2005 |
| JP | 2007-164182 A | 6/2007 |
| WO | WO-98/53365 A1 | 11/1998 |

OTHER PUBLICATIONS

English Computer translation for JP-2007-164182-A dated Jun. 28, 2007.

* cited by examiner

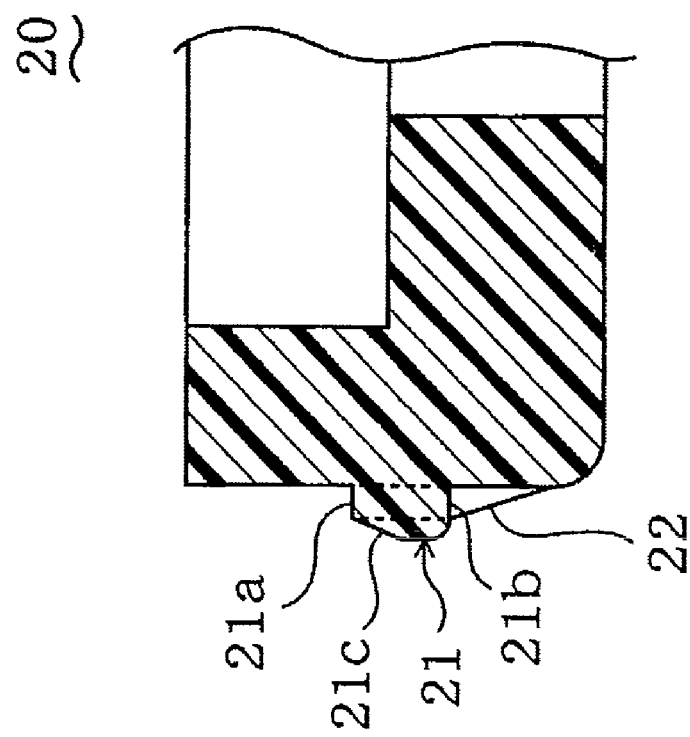
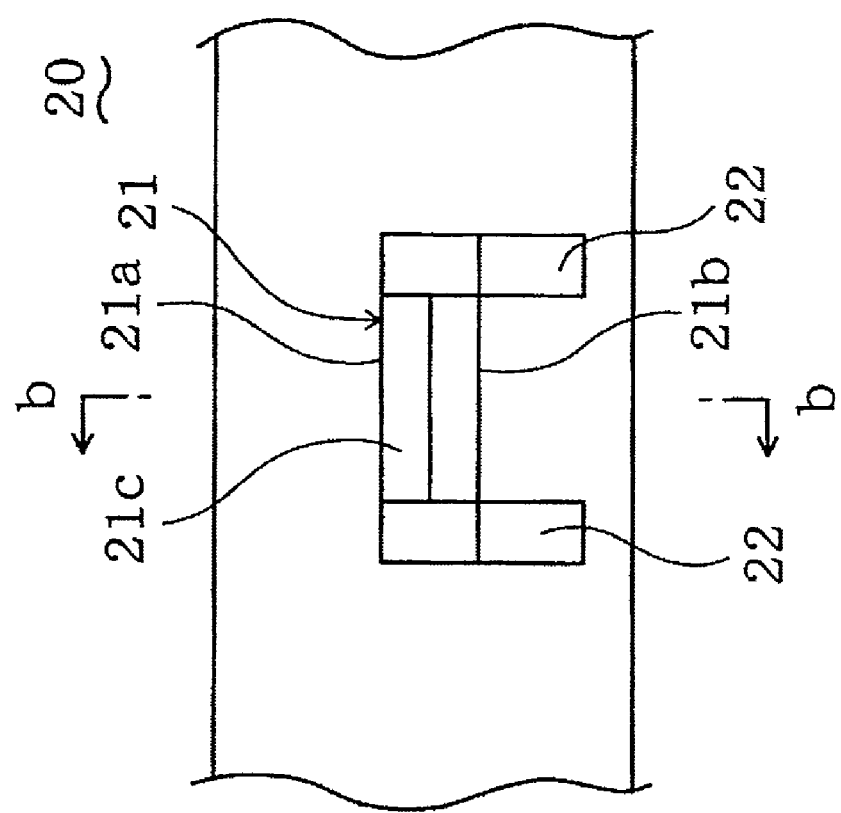
FIG. 4A
FIG. 4B

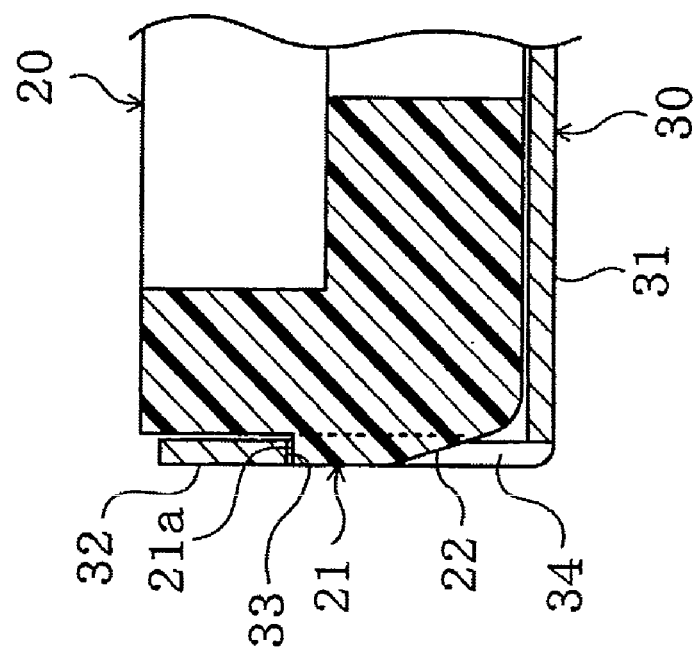
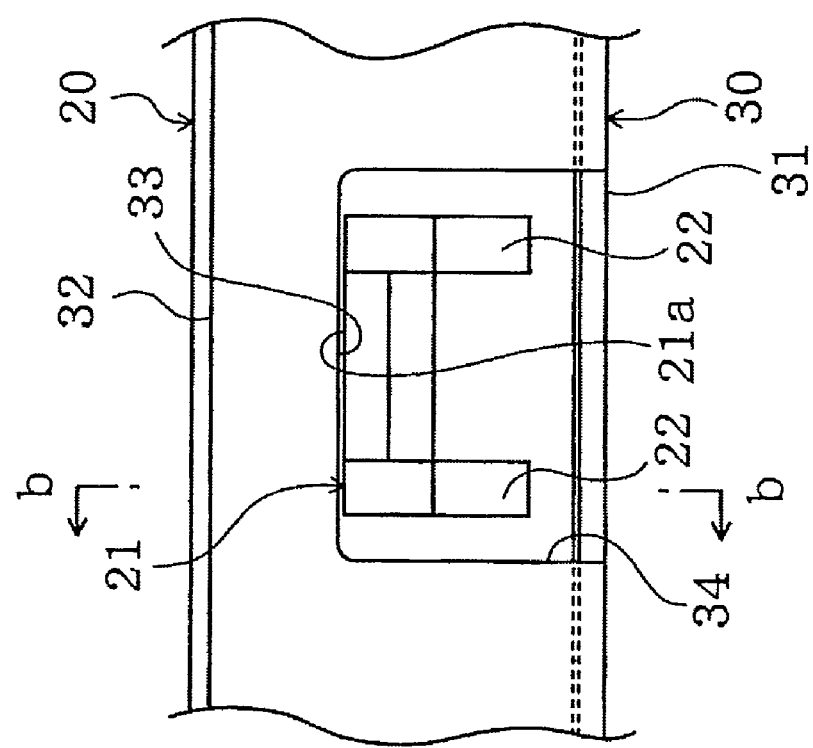

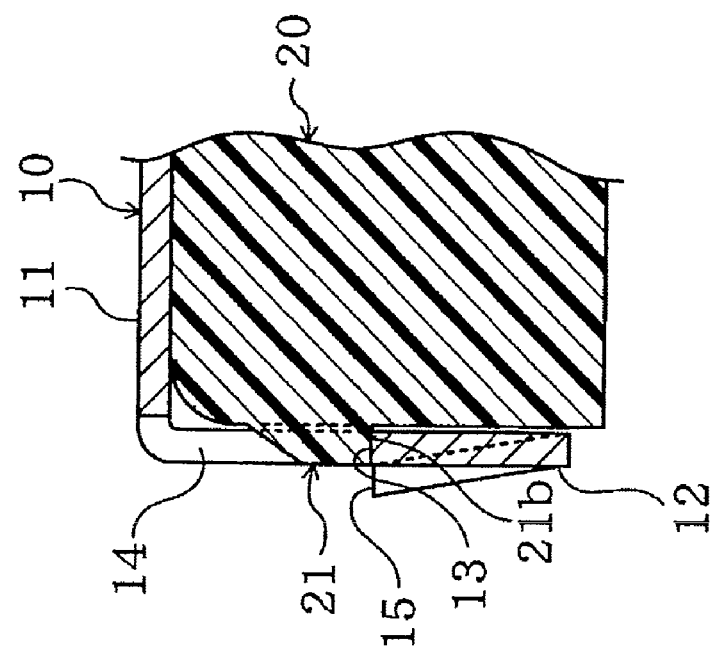
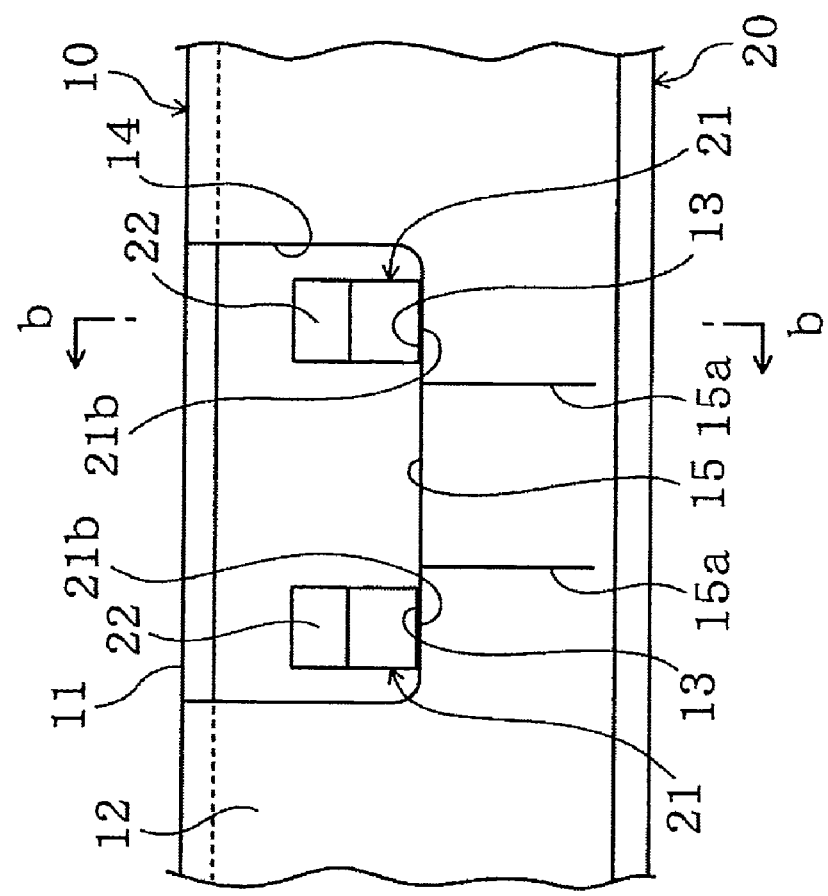

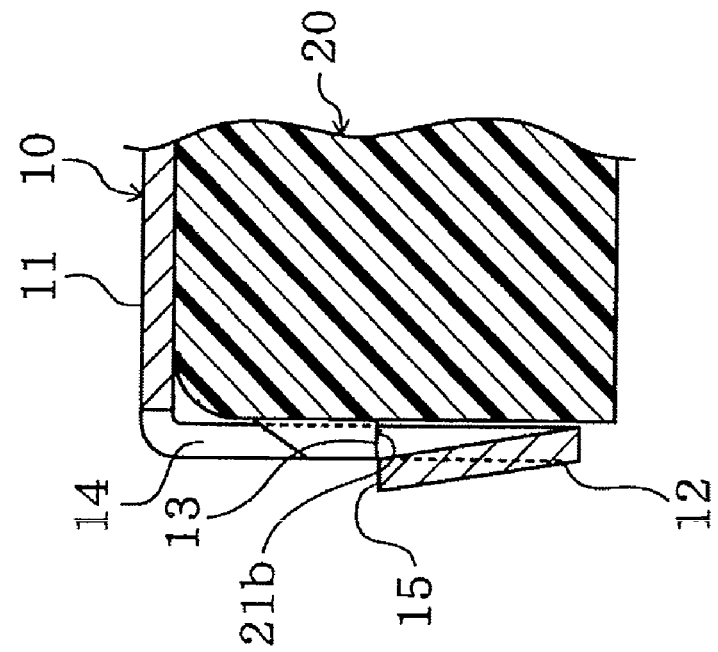
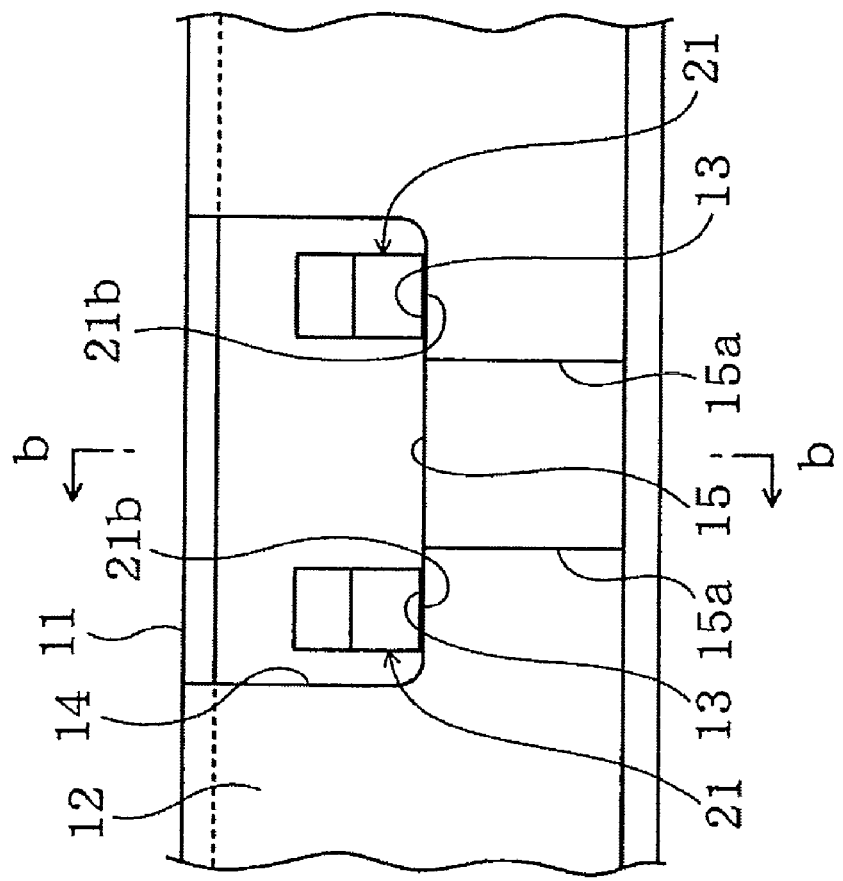
FIG. 11A
FIG. 11B

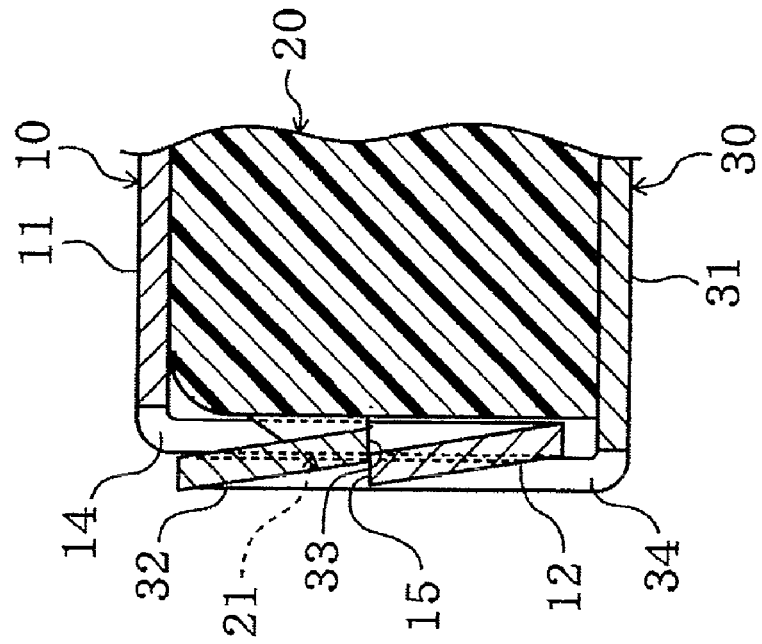
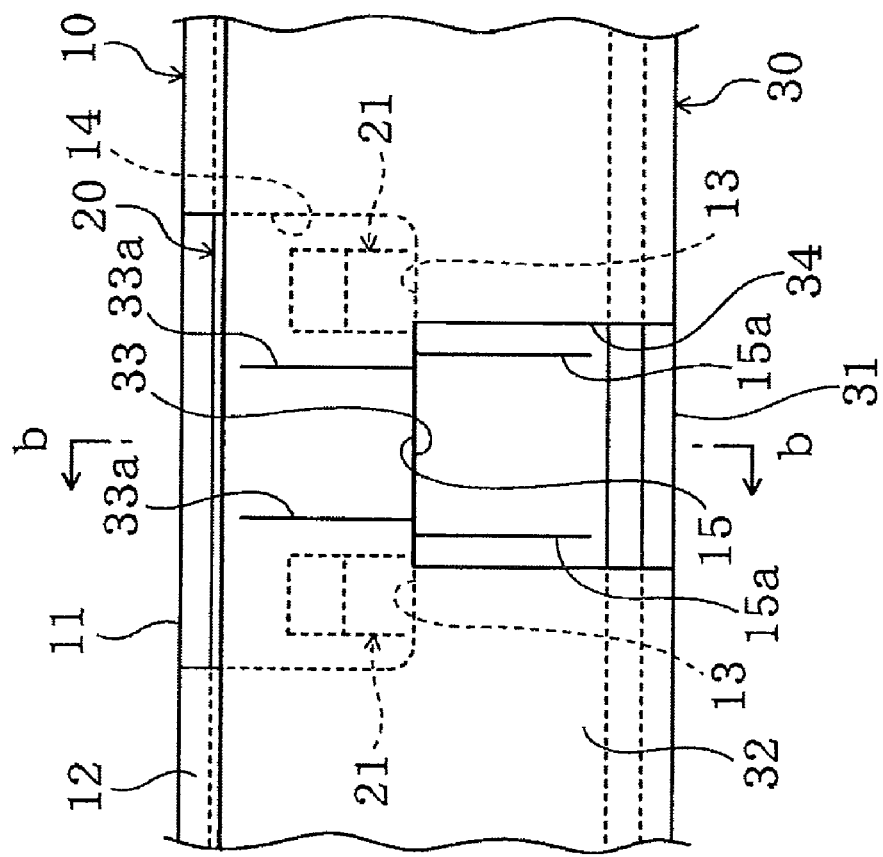
FIG. 12A
FIG. 12B

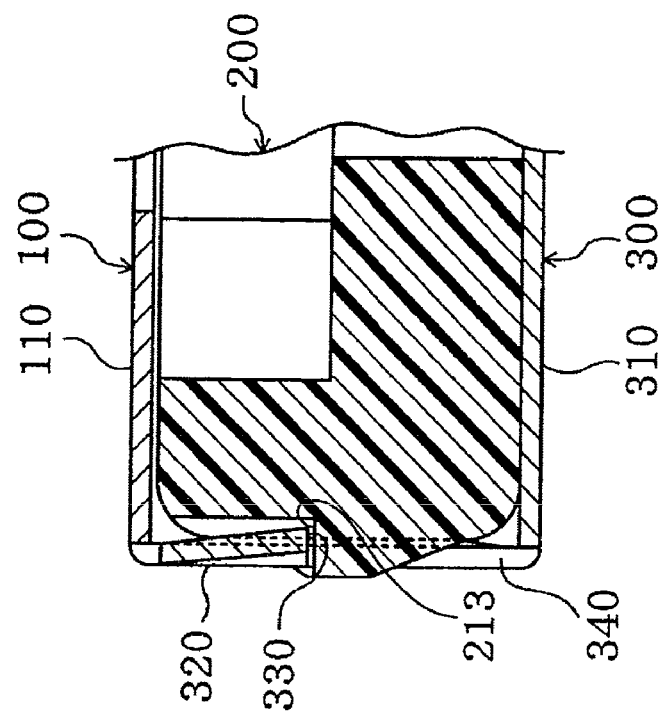
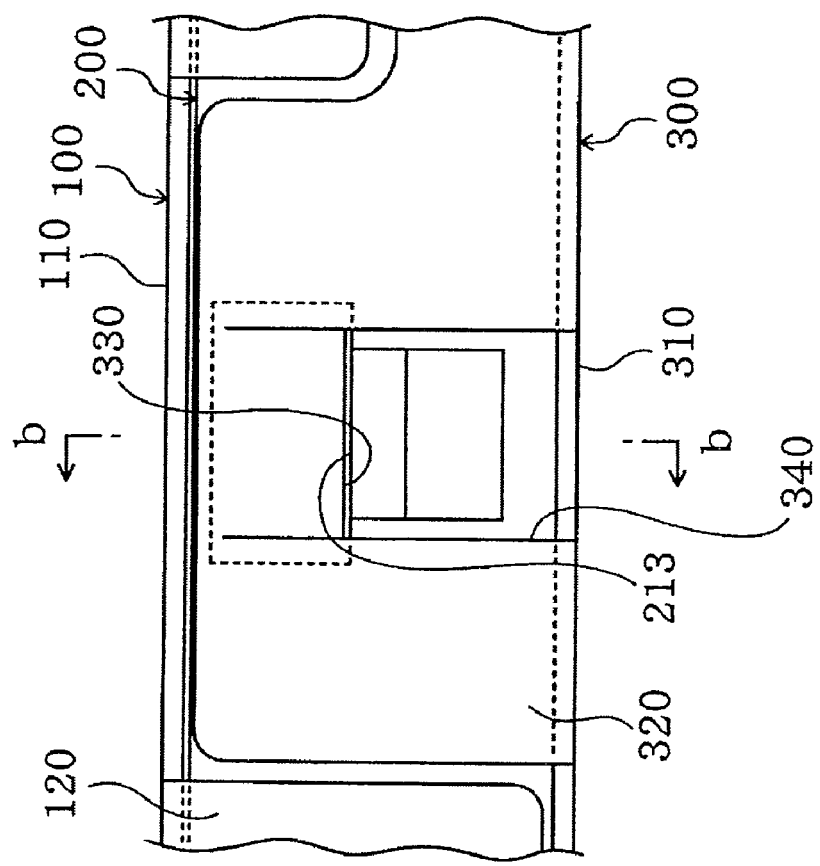

US 8,284,343 B2

FRAME STRUCTURE AND DISPLAY EQUIPPED WITH THE SAME

TECHNICAL FIELD

The present disclosure relates to frame structures for mobile apparatuses, for accommodating equipments such as, e.g., a liquid crystal display (LCD) module, and more particularly, to measures to improve the strength thereof.

BACKGROUND ART

In general, known examples of frame structures for accommodating equipments such as an LCD module formed by a LCD panel unit and a backlight unit include: frame structures including a frame, having its front face side open and its rear face side closed, and a front frame attached to the front face side of the frame, as described in Patent Documents 1 and 2; and frame structures including an intermediate frame, having its front and rear face sides open, and a front frame and a rear frame, which are attached to the intermediate frame, as described in Patent Documents 3 and 4. The latter frame structures are often used as frame structures for mobile LCD devices.

More specifically, as shown in FIG. 13 (an exploded perspective view), such a frame structure for mobile apparatuses includes: a rectangular frame-shaped intermediate frame 200 having its front and rear face sides open; a front frame 100 having a front face portion 110 and a side face portion 120, and attached to the intermediate frame 200 so that the front face portion 110 and the side face portion 120 are respectively positioned on the front and side face sides of the intermediate frame 200; and a rear frame 300 having a rear face portion 310 and a side face portion 320, and attached to the intermediate frame 200 so that the rear face portion 310 and the side face portion 320 are respectively positioned on the rear and side face sides of the intermediate frame 200.

Incidentally, in the conventional case, as shown also in FIG. 14 (an enlarged exploded perspective view of a main part), a plurality of protrusions 211 exclusively for the front frame, and a plurality of protrusions 213 exclusively for the rear frame are provided on the side face of the intermediate frame 200, while engaging portions 130, which are respectively latched by the front frame protrusions 211, are provided in the side face portion 120 of the front frame 100, and engaging portions 330, which are respectively latched by the rear frame protrusions 213, are provided in the side face portion 320 of the rear frame 300.

As shown in FIG. 15(a) (a front view), and FIG. 15(b), which is a cross-sectional view taken along line b-b in FIG. 15(a), the side face portion 120 of the front frame 100 has openings 140, which are provided so as to expose the respective protrusions 211 laterally outward, and each engaging portion 130 is formed by a rear opening edge of a corresponding one of the openings 140. On the other hand, as shown in FIG. 16(a) (a front view), and FIG. 16(b), which is a cross-sectional view taken along line b-b in FIG. 16(a), the side face portion 320 of the rear frame 300 has openings 340, which are provided so as to expose the respective protrusions 213 laterally outward, and each engaging portion 330 is formed by a rear opening edge of a corresponding one of the openings 340.

CITATION LIST

Patent Document

PATENT DOCUMENT 1: Japanese Published Patent Application No. 2003-166513 (page 3, FIGS. 1 and 2)
PATENT DOCUMENT 2: Japanese Published Patent Application No. H11-231290 (page 3, FIGS. 1 and 3)
PATENT DOCUMENT 3: Japanese Published Patent Application No. 2000-258756 (page 4, FIGS. 4 and 5)
PATENT DOCUMENT 4: Japanese Published Patent Application No. 2003-279934 (page 6, FIGS. 2 and 3)

SUMMARY OF THE INVENTION

Technical Problem

Incidentally, in the above conventional case, the following structure is used to avoid interference between the side face portion 120 of the front frame 100 and the side face portion 320 of the rear frame 300. As shown in phantom in FIG. 14, a region 190, corresponding to a portion including the engaging portions 330 of the rear frame 300, has been removed from the side face portion 120 of the front frame 100, while a region 390, corresponding to a portion including the engaging portions 130 of the front frame 100, has been removed from the side face portion 320 of the rear frame 300, so that the side face portion 120 and the side face portion 320 do not overlap each other. This causes a problem in that the strength of the frames 100, 300 is reduced by such removed portions 190, 390.

Another problem is that, when subjected to a large impact force such as when dropped, each frame 100 (or 300) tends to be displaced to the state where the engaging portions 130 (or 330) are displaced laterally outward from the respective protrusions 211 (or 213), and thus, tends to be removed from the intermediate frame 200. Thus, the frame structure does not function as desired to protect equipments in the frame structure in a desirable manner The present invention was developed in view of the above problems, and it is a primary object of the present invention to enable the strength of each frame to be easily ensured by significantly reducing the portions that are respectively removed from respective side face portions of a front frame and a rear frame without hindering attachment of the front frame and the rear frame to an intermediate frame, and to prevent the front frame or the rear frame from being easily removed from the intermediate frame when subjected to a large impact force, in a frame structure for mobile apparatuses, which is configured to accommodate a display unit, such as a mobile LCD unit, by respectively attaching the front frame and the rear frame to the front and rear of an intermediate frame.

Solution to the Problem

In order to achieve the above object, in the present invention, a side face portion of a front frame and a side face portion of a rear frame overlap each other, in order to reduce a portion that is removed from the side face portion of each frame. Moreover, engaging portions of the frame, whose side face portion is positioned on a laterally inner side, are pressed by the frame, whose side face portion is positioned on a laterally outer side, in order to prevent the engaging portions from being easily removed from respective protrusions.

More specifically, a frame structure according to the present invention includes: an intermediate frame; a front frame having a front face portion and a side face portion, which are provided so as to be positioned on front and side face sides of the intermediate frame, respectively, where the front frame is attached to the intermediate frame such that the front face portion and the side face portion are positioned on the front and side face sides of the intermediate frame, respectively; and a rear frame having a rear face portion and a side face portion, which are provided so as to be positioned on rear and side face sides of the intermediate frame, respectively, where the rear frame is attached to the intermediate frame such that the rear face portion and the side face portion are positioned on the rear and side face sides of the intermediate frame, respectively.

The front frame and the rear frame are provided so that the respective side face portions thereof overlap each other, and the intermediate frame has a plurality of protrusions, which are provided on a side face of the intermediate frame so as to protrude laterally outward.

Of the front frame and the rear frame in the above structure, a frame, whose side face portion is positioned on a laterally inner side, has a plurality of engaging portions, which are provided in the side face portion of the frame so as to be latched by the plurality of protrusions, respectively, where the frame is attached to the intermediate frame by latching the plurality of engaging portions by the plurality of protrusions, respectively. On the other hand, of the front frame and the rear frame, a frame, whose side face portion is positioned on a laterally outer side, has a plurality of engaging portions, which are provided in the side face portion of the frame so as to be latched by the plurality of protrusions, respectively, where the frame is attached to the intermediate frame by latching the plurality of engaging portions by the plurality of protrusions, respectively.

Note that, in the above configuration, the frame structure can be configured so that the frame whose side face portion is located on the laterally inner side has a plurality of cutouts, which are provided by cutting out a part of the side face portion of the frame so as to expose the plurality of protrusions laterally outward, respectively, each of the plurality of engaging portions of this frame is formed by a part of a cutout edge of a corresponding one of the plurality of cutouts, and the plurality of engaging portions of the frame, whose side face portion is positioned on the laterally outer side, are latched by the protrusions via the plurality of cutouts, respectively.

In the case where the plurality of protrusions of the intermediate frame are used exclusively for either the front frame or the rear frame, the frame structure can be configured so that, of the front frame and the rear frame, a frame whose side face portion is positioned on a laterally inner side has a plurality of engaging portions, which are provided in the side face portion of the frame so as to be latched by the plurality of protrusions, respectively, and a plurality of latching portions provided in the side face portion of the frame, where the frame is attached to the intermediate frame by latching the plurality of engaging portions by the plurality of protrusions, respectively, whereas, of the front frame and the rear frame, a frame, whose side face portion is positioned on a laterally outer side, has a plurality of engaging portions, which are provided in the side face portion of the frame so as to be latched by the plurality of latching portions, respectively, where the frame is attached to the intermediate frame so that the frame whose side face portion is positioned on the laterally inner side is interposed therebetween, by latching the plurality of engaging portions by the plurality of latching portions, respectively.

Note that, in the above configuration, the frame whose side face portion is positioned on the laterally inner side can have a plurality of cutouts provided by cutting out a part of the side face portion of the frame so as to expose the plurality of protrusions laterally outward, respectively, and each of the plurality of engaging portions and the plurality of latching portions of this frame can be formed by a part of a cutout edge of a corresponding one of the plurality of cutouts.

Moreover, as a display device including the frame structure configured as described above can include a display panel supported by the intermediate frame of the frame structure, for displaying visual information, and the front face portion of the front frame can be formed so as to cover a periphery of a display area in the display panel. In this case, the display panel can be an LCD panel having a pair of transparent substrates, and a liquid crystal layer interposed between the pair of transparent substrates.

Advantages of the Invention

According to the present invention, since respective side faces of a front frame and a rear frame can be made to overlap each other, the strength of both the front frame and the rear frame can be increased as compared to the case where the side face portions do not overlap each other as in conventional examples. This can contribute to an increase in strength as a frame structure, and the side face portion of the frame, whose side face portion is positioned on the laterally outer side, can restrict the movement of the engaging portions of the frame, whose side face portion is positioned on the laterally inner side, in the direction in which the engaging portions are removed from the respective protrusions. Thus, the frame, whose side surface portion is positioned on the laterally inner side, is not easily removed from the intermediate frame when, e.g., subjected to an impact force when dropped, whereby a function to protect equipments in the frame structure can be enhanced.

BRIEF DESCRIPTION OF THE DRAWINGS

FIG. 4(a) is an enlarged view showing a main part of a side face portion of the intermediate frame, and FIG. 4(b) is a cross-sectional view taken along line b-b in FIG. 4(a).

FIG. 5(a) is a diagram corresponding to FIG. 4(a), showing a state where the rear frame is attached to the intermediate frame, and FIG. 5(b) is a cross-sectional view taken along line b-b in FIG. 5(a).

FIG. 10(a) is a diagram corresponding to FIG. 4(a), showing a main part of a side surface portion of the intermediate frame, and FIG. 10(b) is a cross-sectional view taken along line b-b in FIG. 10(a).

FIG. 11(a) is a diagram corresponding to FIG. 10(a), showing a state where the front frame is attached to the intermediate frame, and FIG. 11(b) is a cross-sectional view taken along line b-b in FIG. 11(a).

FIG. 12(a) is a diagram corresponding to FIG. 10(a), showing a state where the rear frame is attached to the intermediate frame and the front frame, and FIG. 12(b) is a cross-sectional view taken along line b-b in FIG. 12(a).

FIG. 16(a) is an enlarged front view of a main part, showing a state where the front frame is attached to the intermediate frame, and FIG. 16(b) is a cross-sectional view taken along line b-b in FIG. 16(a).

DESCRIPTION OF REFERENCE CHARACTERS

| | |
|---|---|
| 10 | Front Frame |
| 11 | Front Face Portion |
| 12 | Side Face Portion |
| 13 | Engaging Portion |
| 14 | Opening (Cutout) |
| 15 | Latching Portion |
| 20 | Intermediate Frame |
| 21 | Protrusion |
| 30 | Rear Frame |
| 31 | Rear Face Portion |
| 32 | Side Face Portion |
| 33 | Engaging Portion |
| 34 | Opening (Cutout) |
| 40 | LCD Panel (Display Panel) |

DESCRIPTION OF EMBODIMENTS

Embodiments of the present invention will be described below with reference to the accompanying drawings.

(First Embodiment)

Figure 1:
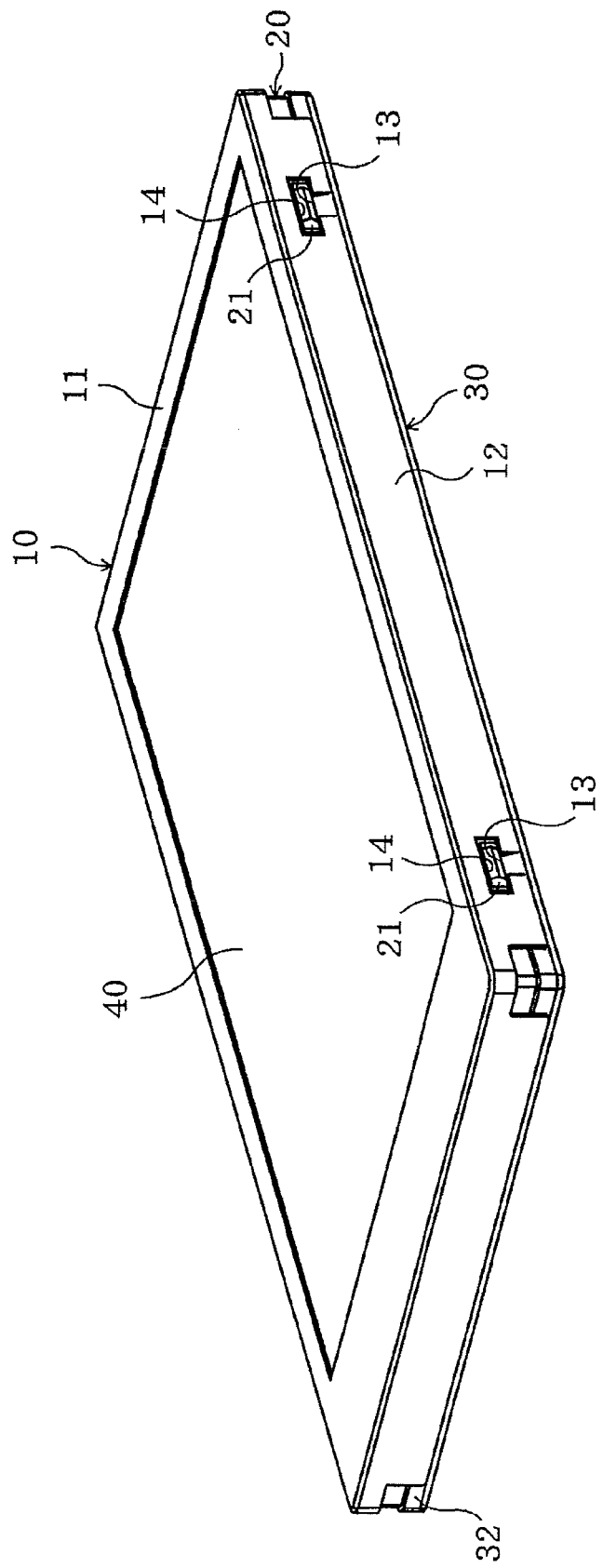
FIG. 1 is a perspective view of an LCD device according to a first embodiment of the present invention.
Figure 2:
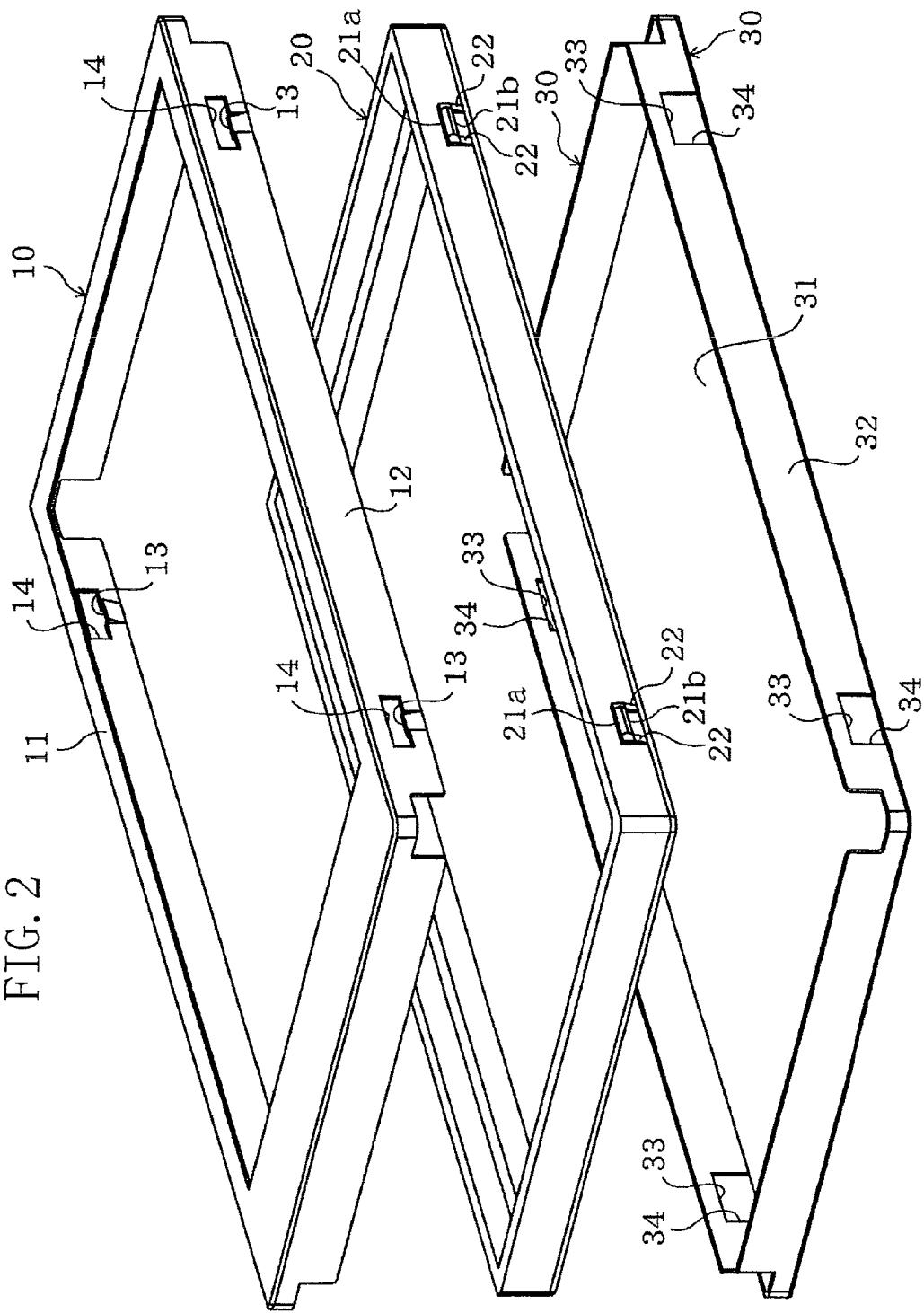
FIG. 2 is an exploded perspective view showing an intermediate frame, a rear frame, and a front frame of the LCD device.
Figure 3:
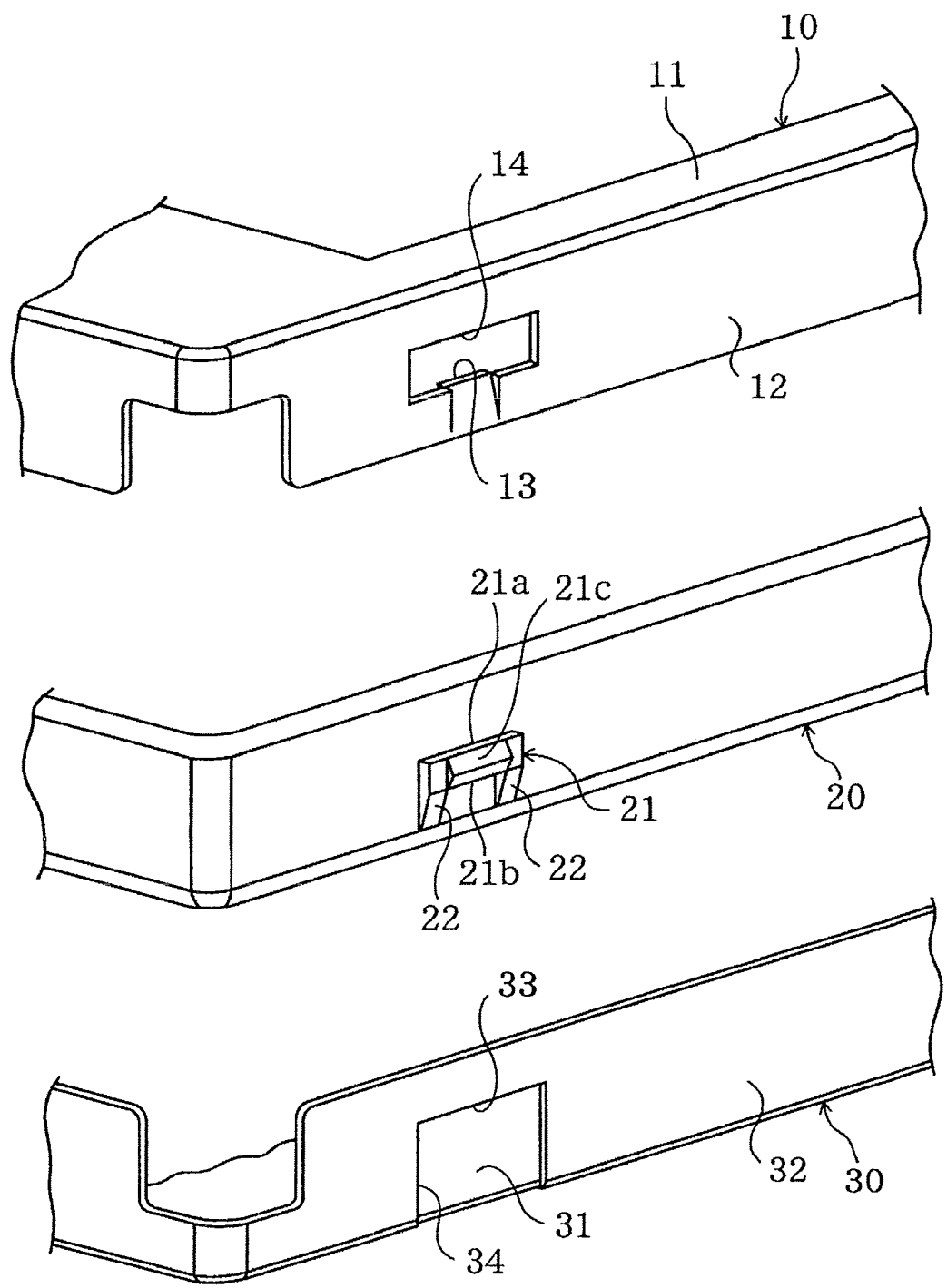
FIG. 3 is an enlarged exploded perspective view showing a part of each of the intermediate frame, the rear frame, and the front frame.
Figure 6A:
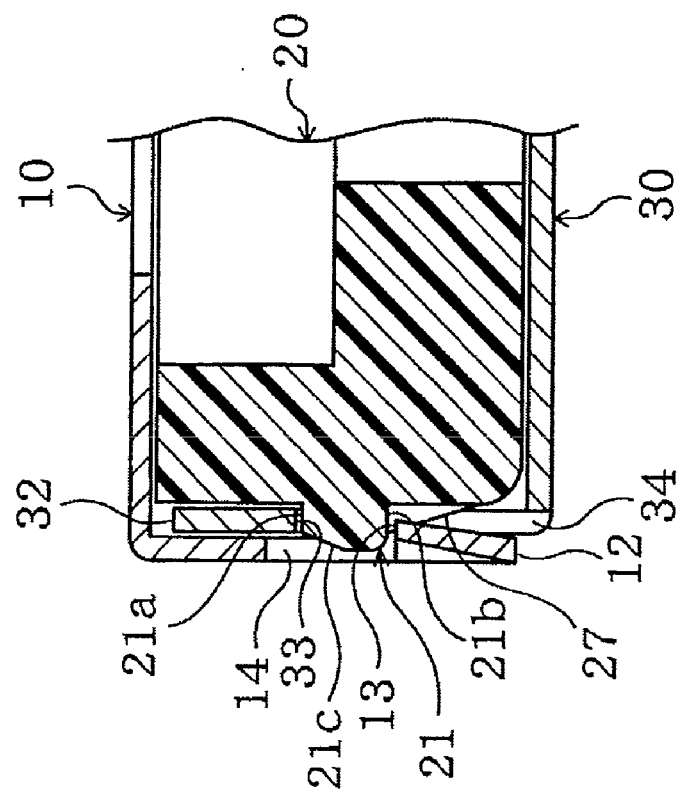
FIG. 6(a) is a diagram corresponding to FIG. 4(a), showing a state where the front frame is attached to the intermediate frame and the rear frame.
Figure 6B:
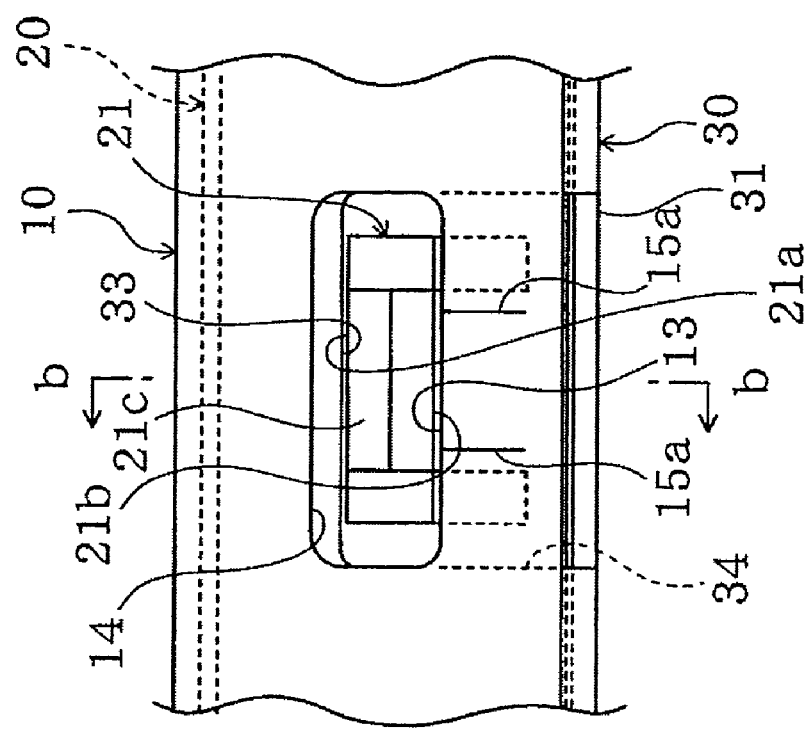
FIG. 6(b) is a cross-sectional view taken along line b-b in FIG. 6(a).

FIG. 1 is a perspective view showing the overall structure of an LCD device according to a first embodiment of the present invention. This LCD device includes an LCD panel unit, a backlight unit positioned on the rear side of the LCD panel unit, and a frame structure for accommodating an LCD module that is formed by the LCD panel unit and the backlight unit. The LCD panel unit includes an LCD panel 40, which has a liquid crystal layer interposed between a pair of transparent substrates, and the backlight unit has a light source body, and a light guide plate for guiding light of the light source body.

This frame structure includes a substantially rectangular intermediate frame 20 made of a resin, a front frame 10 made of a metal plate, and a rear frame 30 also made of a metal plate, where the front frame 10 has a front face portion 11 and a side face portion 12, which are provided so as to be positioned on the front and side face sides of the intermediate frame 20, respectively, and is attached to the intermediate frame 20 so that the front face portion 11 and the side face portion 12 are respectively positioned on the front and side face sides of the intermediate frame 20, and the rear frame 30 has a rear face portion 31 and a side face portion 32, which are provided so as to be positioned on the rear and side face sides of the intermediate frame 20, respectively, and is attached to the intermediate frame 20 so that the rear face portion 31 and the side face portion 32 are respectively positioned on the rear and side face sides of the intermediate frame 20.

The front frame 10 and the rear frame 30 are provided so that the respective side face portions 12, 32 overlap each other. More specifically, in the present embodiment, the rear frame 30 is formed so that the side face portion 32 is positioned on the laterally inner side, and the front frame 10 is formed so that the side face portion 12 is positioned on the laterally outer side. Moreover, the intermediate frame 20 has a plurality of protrusions 21, which are provided on the side surface of the intermediate frame 20 so as to protrude laterally outward.

In the present embodiment, the rear frame 30 has a plurality of engaging portions 33, which are provided in the side face portion 32 of the rear frame 30 so as to be latched by the plurality of protrusions 21 of the intermediate frame 20, respectively. The rear frame 30 is attached to the intermediate frame 20 by latching the engaging portions 33 by the plurality of protrusions 21, respectively. On the other hand, the front frame 10 has a plurality of engaging portions 13, which are provided on the side face portion 12 of the front frame 10 so as to be latched by the plurality of protrusions 21 of the intermediate frame 20, respectively. The front frame 10 is attached to the intermediate frame 20 by latching these engaging portions 13 by the plurality of protrusions 21, respectively. Note that, in the present embodiment, the intermediate frame 20 has four protrusions 21, the rear frame 30 has four engaging portions 33, and the front frame 10 has four engaging portions 13.

More specifically, the intermediate frame 20 has two longer sides and two shorter sides, where two protrusions 21 are provided on each of the two longer sides of the intermediate frame 20. That is, four protrusions 21 are provided in the present embodiment. The amount by which each protrusion 21 protrudes is substantially equal to, or slightly smaller than, the sum of the respective thicknesses of the rear frame 30 and the front frame 10. Each protrusion 21 is shaped like a ridge extending in a longitudinal direction, where a front sidewall surface of each protrusion 21 serves as a front latching surface 21a for latching a corresponding one of the engaging portions 33 of the rear frame 30, and a rear sidewall surface of each protrusion 21 serves as a rear latching surface 21b for latching a corresponding one of the engaging portions 13 of the front frame 10. Moreover, guide portions 22 are respectively provided at both ends of each protrusion 21. Each guide portion 22 is a convex slope which is tapered laterally inward from its front end to a ridgeline portion between the side and rear faces of the intermediate frame 20. When pressing the rear frame 30 so that the engaging portions 33 slide over the protrusions 21 to the respective positions where the engaging portions 33 are latched by the protrusions 21, the guide portions 22 function to elastically deform the side face portion 32 in the laterally outward direction in which the engaging portions 33 are displaced, according to the amount by which the rear frame 30 is moved.

A top part of each protrusion 21 has a substantially inverted U-shaped cross section with a gently curved top. In particular, a front surface of the top part serves as a guide surface 21c, which is tapered laterally inward from its top end to its front end. When pressing the front frame 10 so that the engaging portions 13 slide over the protrusions 21 to the respective positions where the engaging portions 13 are latched by the protrusions 21, the guide surfaces 21c function to elastically deform the side face portion 12 in the laterally outward direction in which the engaging portions 13 are displaced, according to the amount by which the front frame 10 is moved.

The rear frame 30 has a plurality of (four in the present embodiment) openings 34 as cutouts, in addition to the plurality of engaging portions 33, where the openings 34 are provided by cutting out a part of the side face portion 32 of the rear frame 30 so as to expose the plurality of protrusions 21 laterally outward, and each of the plurality of engaging portions 33 is formed by a part of an opening edge of a corresponding one of the plurality of openings 34. The rear frame 30 has two longer sides and two shorter sides, and the plurality of engaging portions 33 and the plurality of openings 34 are provided so that two engaging portions 33 and two openings 34 are positioned on each of the two longer sides. The openings 34 have a substantially rectangular shape whose longitudinal dimension is larger than its lateral dimension. Moreover, the longitudinal dimension of the openings 34 is slightly larger than the length dimension (the longitudinal dimension) of the protrusions 21. Each opening 34 has two (front and rear) longitudinally extending opening edges, where the rear opening edge is positioned in a ridgeline portion between the rear face portion 31 and the side face portion 32 of the rear frame 30. On the other hand, the front opening edge is disposed so as to be positioned at a location where the front opening edge is latched by the front latching surface 21a of a corresponding one of the protrusions 21, when the rear frame 30 is properly attached to the intermediate frame 20. That is, each engaging portion 33 is formed by the front opening edge.

The front frame 10 has a plurality of (four in the present embodiment) openings 14 as cutouts, in addition to the plurality of engaging portions 13, where the openings 14 are provided by cutting out a part of the side face portion 12 of the front frame 10 so as to expose the plurality of protrusions 21 laterally outward, and each of the plurality of engaging portions 13 is formed by a part of an opening edge of a corresponding one of the plurality of openings 14. The front frame 10 has two longer sides and two shorter sides, where the plurality of engaging portions 13 and the plurality of openings 14 are provided so that two engaging portions 13 and two openings 14 are positioned on each of the two longer sides. The openings 14 have a substantially rectangular shape whose longitudinal dimension is larger than its lateral dimension. The longitudinal dimension of the openings 14 is substantially the same as the longitudinal dimension of the openings 34 of the rear frame 30, and is slightly larger than the length dimension (the longitudinal dimension) of the protrusions 21. Each opening 14 has two (front and rear) longitudinally extending opening edges, where the front opening edge is disposed so as to be positioned at a location where the front opening edge is withdrawn from the front latching surface 21a of a corresponding one of the protrusions 21 in the forward direction, when the front frame 10 is properly attached to the intermediate frame 20. On the other hand, the rear opening edge is disposed so as to be positioned at a location where the rear opening edge is latched by the rear latching surface 21b of a corresponding one of the protrusions 21, when the front frame 10 is properly attached to the intermediate frame 20. That is, each engaging portion 13 is formed by the rear opening edge.

Moreover, cuts 13a are made on both sides of each engaging portion 13 of the front frame 10 in the longitudinal direction so as to extend rearward from a corresponding one of the opening edges. A portion including the engaging portion 13 is shaped like a tongue piece that is tilted along the cuts 13a so that its engaging portion 13 side is displaced laterally inward. Thus, each engaging portion 13 engages with a corresponding one of the protrusions 21 at a position laterally inside the side face portion 12 of the front frame 10.

An assembly operation of the frame structure in the LCD device configured as described above will be described below.

The rear frame 30 is positioned behind the intermediate frame 20. With the side face portion 32 facing the intermediate frame 20, the rear frame 30 is moved closer to the intermediate frame 20. By pressing the rear frame 30 so that the side face portion 32 of the rear frame 30 moves forward on the side face of the intermediate frame 20, the side face portion 32 of the rear frame 30 moves forward while being elastically deformed by the guide portions 22 in the laterally outward direction in which the engaging portions 33 are displaced. Then, after the engaging portions 33 slide over the respective protrusions 21, the side face portion 32 of the rear frame 30 is elastically restored to its original shape, and the engaging portions 33 are displaced laterally inward. Thus, each engaging portion 33 of the rear frame 30 is positioned at a location where the engaging portion 33 is latched by the front latching surface 21a of a corresponding one of the protrusions 21, whereby the rear frame 30 can be smoothly attached to the intermediate frame 20 with a small pressing force.

Then, the front frame 10 is positioned in front of the intermediate frame 20. With the side face portion 12 facing the intermediate frame 20, the front frame 10 is moved closer to the intermediate frame 20, and is pressed so that the side face portion 12 of the front frame 10 moves rearward on the side face portion 32 of the rear frame 30. When the engaging portions 13 slide over the respective protrusions 21, the side face portion 12 of the front frame 10 moves rearward while being elastically deformed by the guide surfaces 21c of the protrusions 21 in the laterally outward direction in which the engaging portions 13 are displaced. Then, after the engaging portions 13 slide over the respective protrusions 21, the side face portion 12 of the front frame 10 is elastically restored to its original shape, and the engaging portions 13 are displaced laterally inward. Thus, each engaging portion 13 of the front frame 10 is positioned at a location where the engaging portion 13 is latched by the rear latching surface 21b of a corresponding one of the protrusions 21, whereby the front frame 10 can be smoothly attached to the intermediate frame 20 with a small pressing force.

Thus, according to the present embodiment, an LCD device is configured to accommodate an LCD module in a frame structure, where the frame structure includes: the intermediate frame 20; the front frame 10 positioned so that the front face portion 11 and the side face portion 12 respectively overlap the front and side faces of the intermediate frame 20, and attached to the intermediate frame 20; and the rear frame 30 positioned so that the rear face portion 31 and the side face portion 32 respectively overlap the rear and side faces of the intermediate frame 20, and attached to the intermediate frame 20. In this LCD device, the side face portion 12 of the front frame 10 is disposed outside the side face portion 32 of the rear frame 30 so as to overlap the side face portion 32 of the rear frame 30, the plurality of protrusions 21 are provided on the side face of the intermediate frame 20 so as to protrude laterally outward, and the plurality of engaging portions 33 are provided in the side face portion 32 of the rear frame 30, whereby the rear frame 30 is attached to the intermediate frame 20 by latching the engaging portions 33 by the plurality of protrusions 21, respectively. On the other hand, the plurality of engaging portions 13 are provided in the side face portion 12 of the front frame 10, whereby the front frame 10 is attached to the intermediate frame 20 by latching the engaging portions 13 by the plurality of protrusions 21, respectively. Thus, the strength of both the front frame 10 and the rear frame 30 can be increased as compared to the case where the side face portions do not overlap each other as in conventional examples. This can contribute to an increase in strength as a frame structure, and in addition, the side face portion 12 of the front frame 10 can restrict the movement of the engaging portions 33 of the rear frame 30 in the direction in which the engaging portions 33 are removed from the respective protrusions 21. This prevents the rear frame 30 from being easily removed from the intermediate frame 20 when, e.g., subjected to an impact force when dropped, whereby a function to protect the LCD module can be enhanced.

Note that, although a total of four protrusions 21 are provided on two longer sides of the intermediate frame 20 in the above embodiment, the positions of the protrusions 21 and the number of protrusions 21 can be determined appropriately as required. However, regarding the engaging portions 33 and the openings 34 of the rear frame 30, and the engaging portions 13 and the openings 14 of the front frame 10, the positions of the engaging portions and the openings, the number of engaging portions, and the number of openings are determined according to the positions of the protrusions 21 and the number of protrusions 21.

Although the openings 14, 34 are respectively formed in the side face portion 12 of the front frame 10 and the side face portion 32 of the rear frame 30 in the above embodiment, cutouts may be formed instead of the openings 14, 34 by cutting out a part of each side face portion 12, 32.

Although the above embodiment is described with respect to the case where the side face portion 32 of the rear frame 30 is positioned laterally inside the side face portion 12 of the front frame 10, the present invention is also applicable to the case where the side face portion 12 of the front frame 10 is positioned laterally inside the side surface portion 32 of the rear frame 30. It should be noted that, in this case, the rear frame 30 and the front frame 10 are attached to the intermediate frame 20 in reverse order, and engaging portions, which are respectively latched by the plurality of protrusions 21, are provided in the rear frame 30, instead of providing, in the front frame 10, the engaging portions 13 that are respectively latched by the plurality of protrusions 21.

(Second Embodiment)

Figure 7:
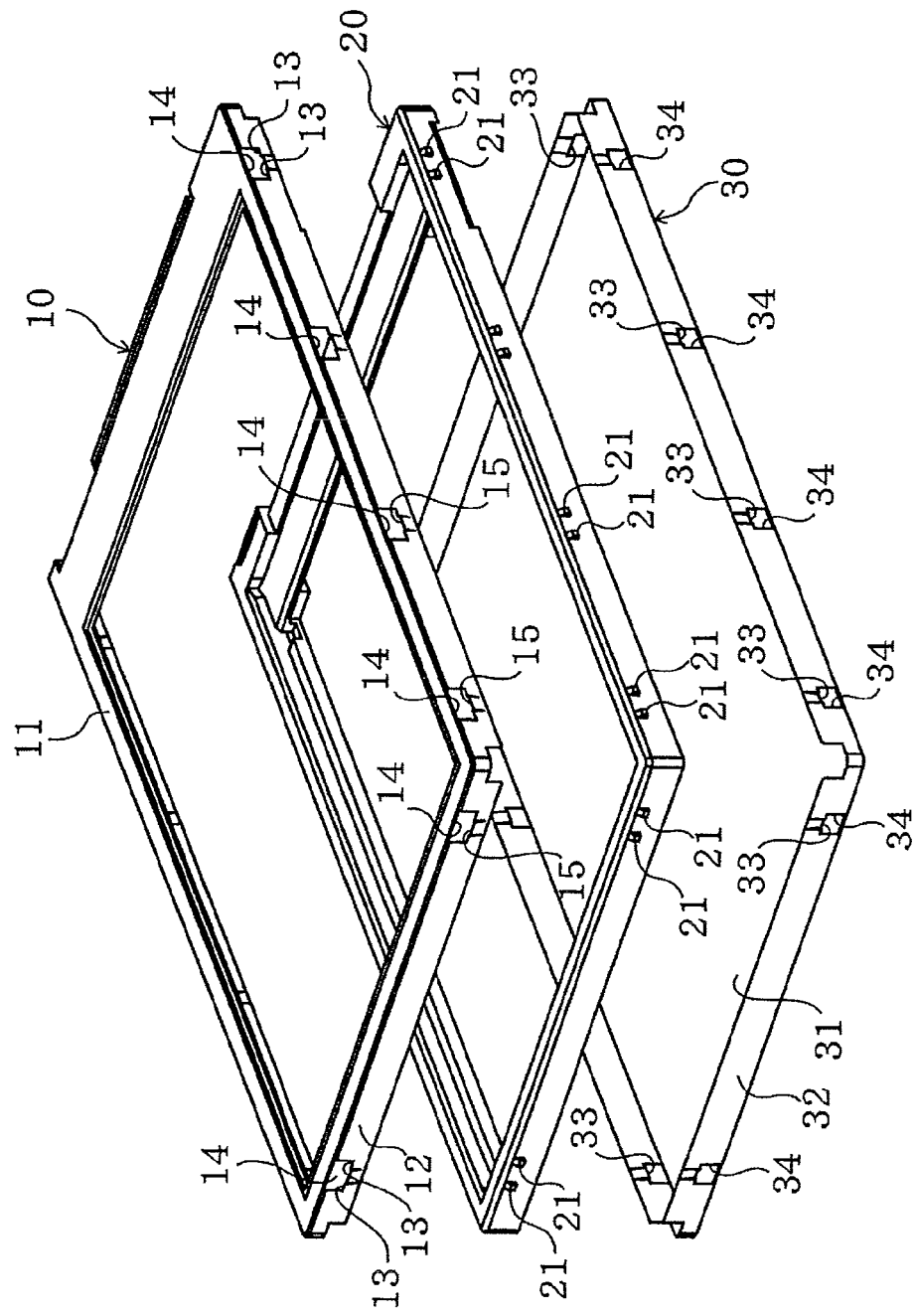
FIG. 7 is a diagram corresponding to FIG. 2, showing an intermediate frame, a rear frame, and a front frame of an LCD device according to a second embodiment of the present invention.
Figure 8:
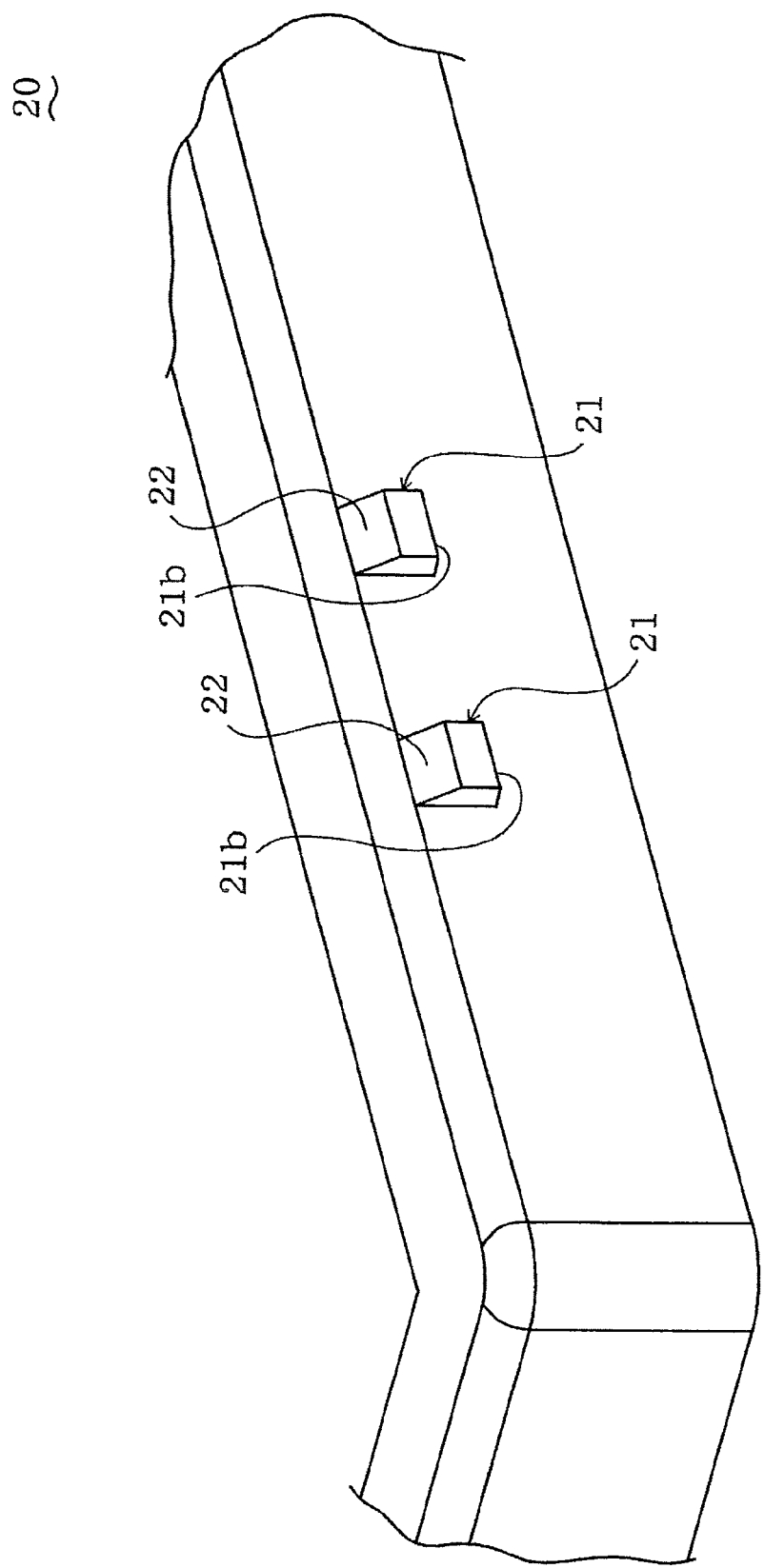
FIG. 8 is an enlarged perspective view of a main part of the intermediate frame.
Figure 9:
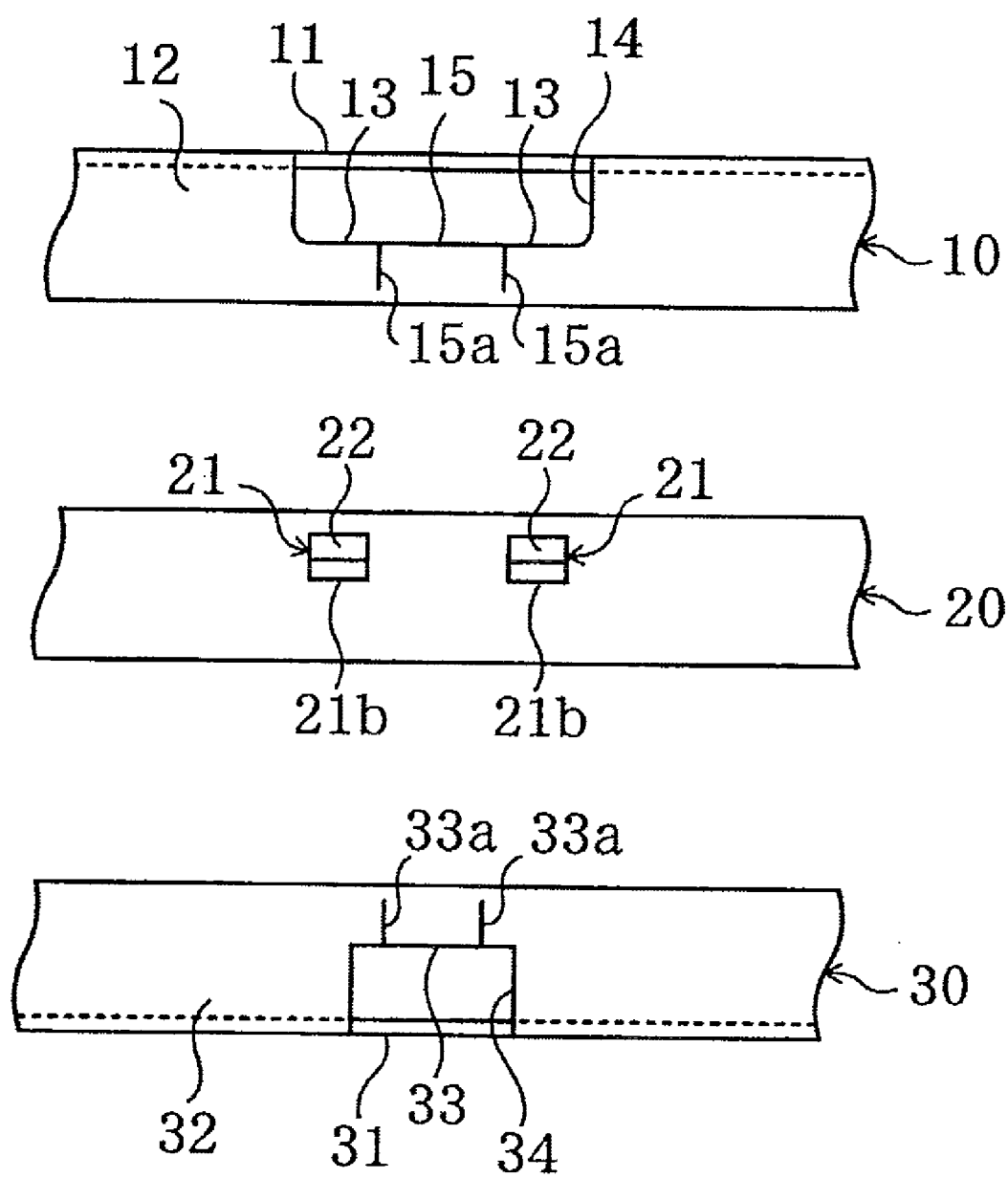
FIG. 9 is an exploded side view showing a main part of each of the intermediate frame, the rear frame, and the front frame.
Figure 13:
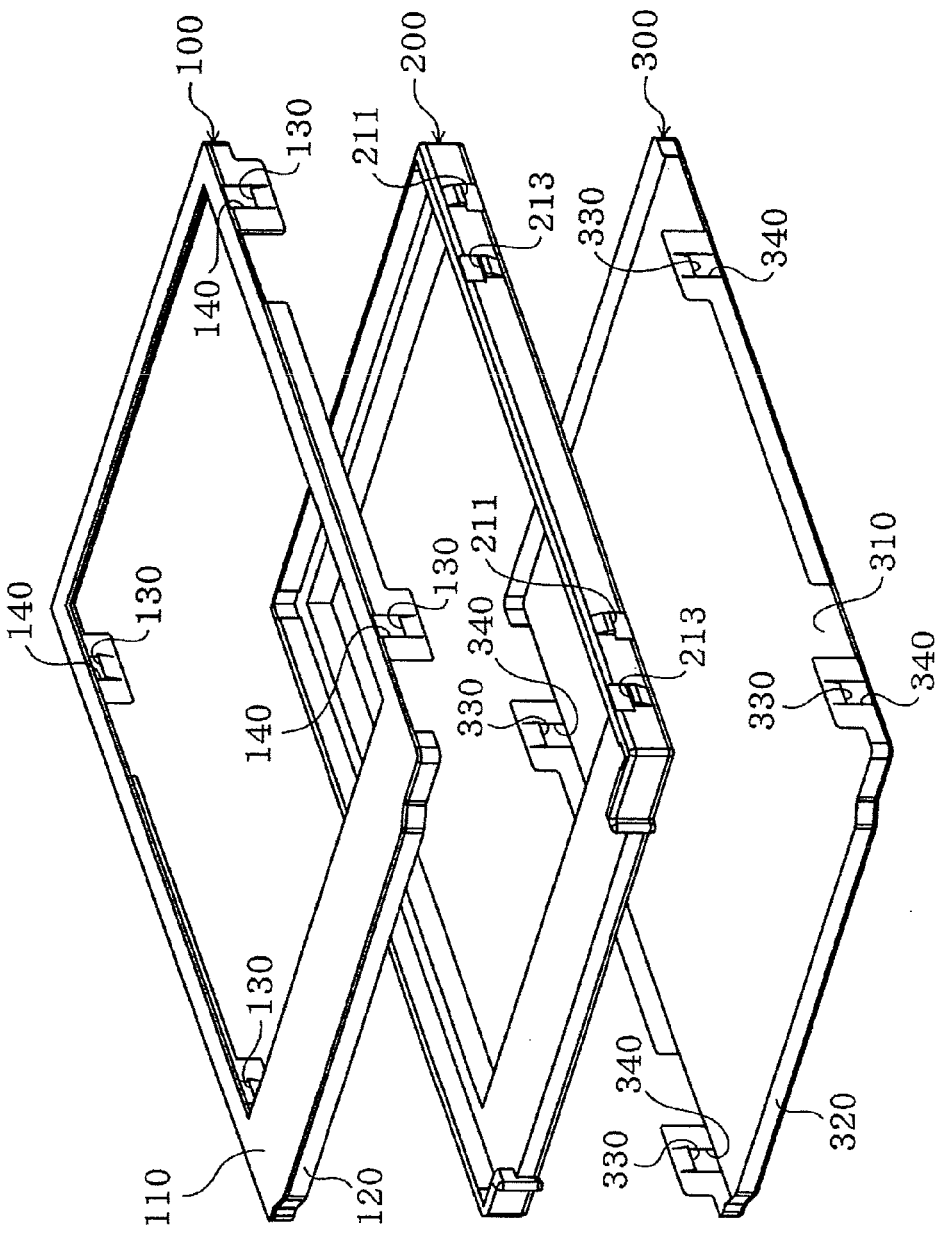
FIG. 13 is an exploded perspective view showing an intermediate frame, a rear frame, and a front frame of a conventional LCD device.
Figure 14:
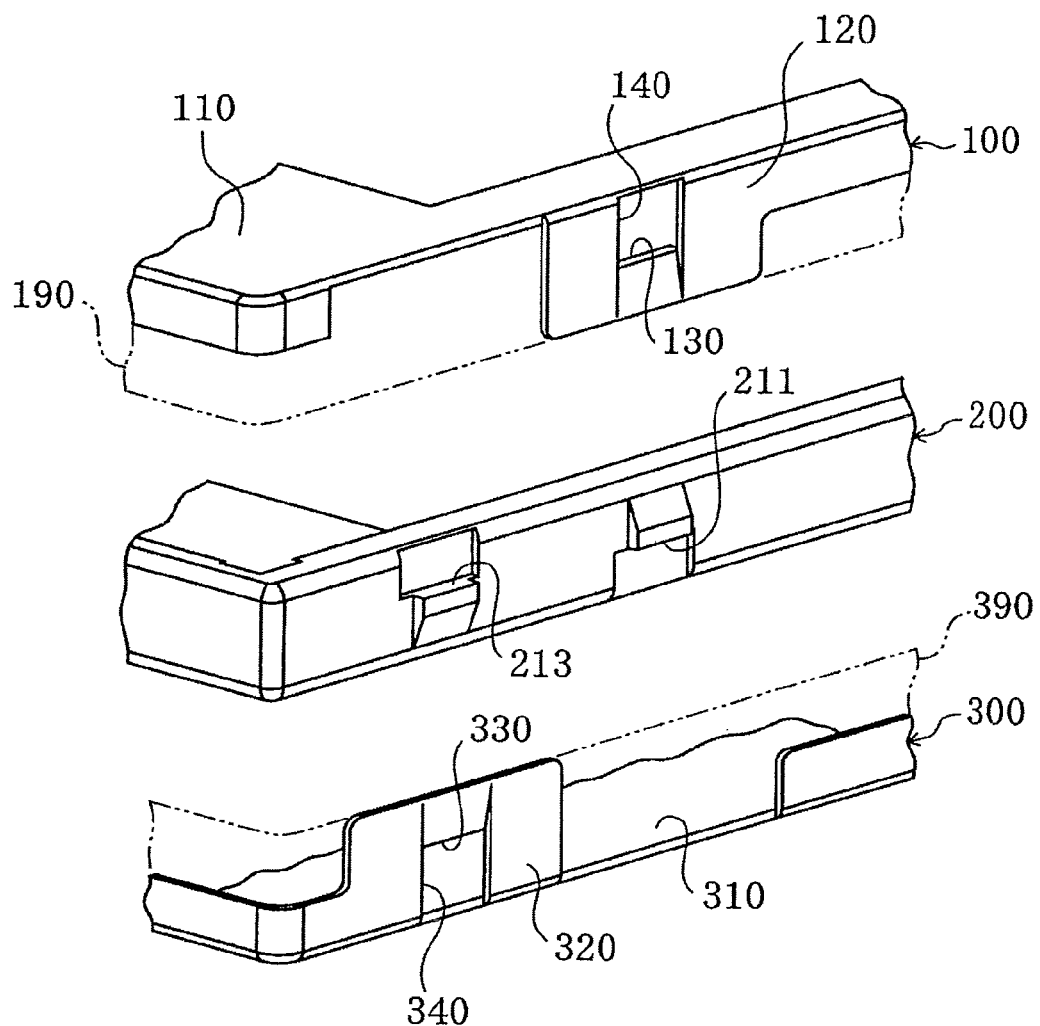
FIG. 14 is an enlarged view corresponding to FIG. 3, showing a part of each of the intermediate frame, the rear frame, and the front frame.
Figure 15B:
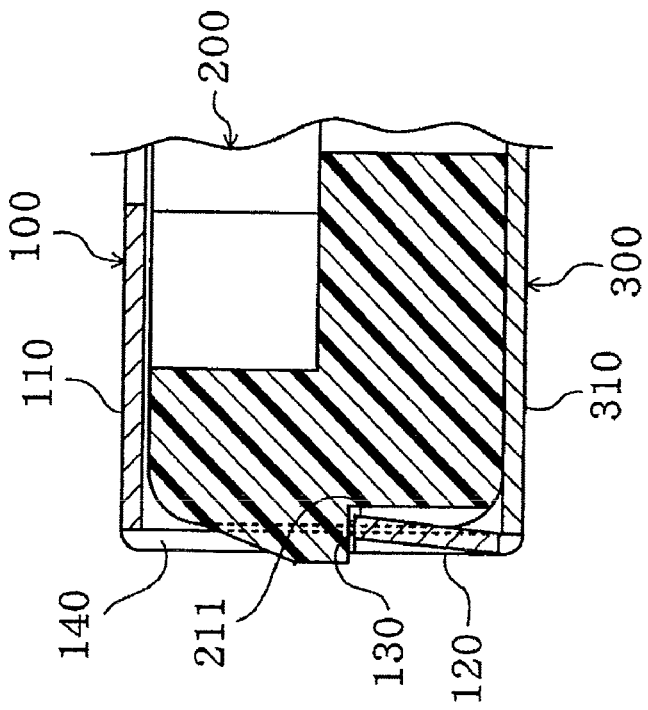
FIG. 15(b) is a cross-sectional view taken along line b-b in FIG. 15(a).
Figure 15A:
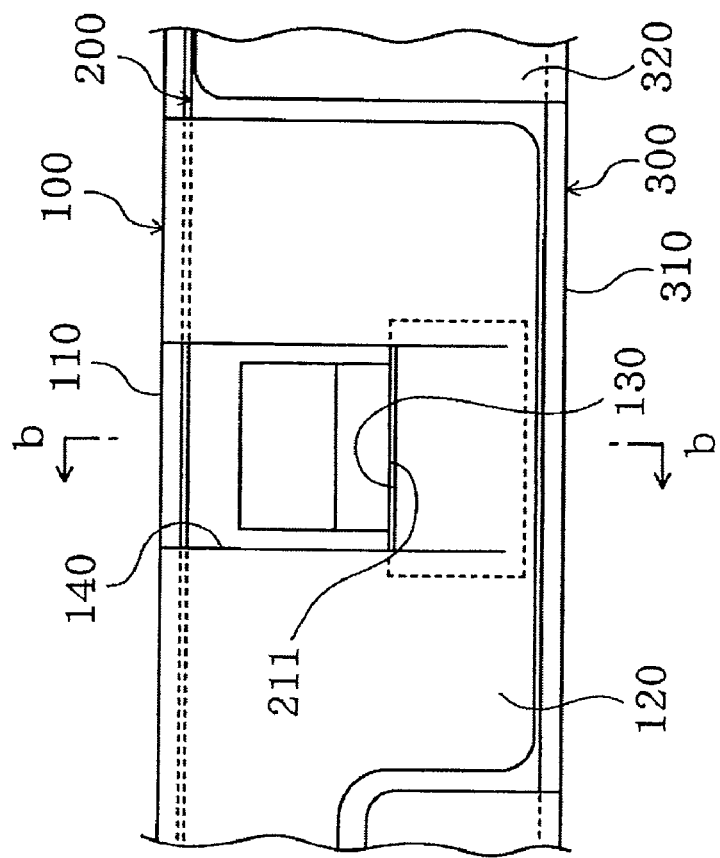
FIG. 15(a) is an enlarged front view of a main part, showing a state where the rear frame is attached to the intermediate frame.

FIG. 7 is an exploded perspective view showing the overall structure of a frame structure in an LCD device according to a second embodiment of the present invention, where the same parts as those of the first embodiment are denoted by the same reference characters.

In the present embodiment, unlike the first embodiment, the side face portion 12 of the front frame 10 is positioned laterally inside the side face portion 32 of the rear frame 30, and the side face portion 32 of the rear frame 30 is the outermost portion of the frame structure in the lateral direction. Like the first embodiment, the plurality of protrusions 21 are provided on the side face of the intermediate frame 20 so as to protrude laterally outward.

In the present embodiment, the front frame 10 has a plurality of engaging portions 13 provided in the side face portion 12 of the front frame 10 so as to be latched by the plurality of protrusions 21, respectively, and a plurality of latching portions 15 provided in the side face portion 12 of the front frame 10. The front frame 10 is attached to the intermediate frame 20 by latching the plurality of engaging portions 13 by the plurality of protrusions 21, respectively. On the other hand, the rear frame 30 has a plurality of engaging portions 33 provided in the side face portion 32 of the rear frame 30 so as to be latched by the plurality of latching portions 15, respectively. The plurality of engaging portions 33 are latched by the plurality of latching portions 15, respectively, whereby the rear frame 30 is attached to the intermediate frame 20 via the front frame 10.

More specifically, the plurality of protrusions 21 of the intermediate frame 20 are provided in pairs. A total of twelve pairs of protrusions 21 are provided on two longer sides and two shorter sides of the intermediate frame 20: four pairs on each longer side, and two pairs on each shorter side. The amount by which the protrusions 21 protrude is substantially equal to the thickness of the front frame 10 or the rear frame 30. That is, the amount by which the protrusions 21 protrude is substantially half that of the first embodiment. Moreover, the two protrusions 21 of each pair on the longer sides are arranged adjacent to each other in a longitudinal direction, and the two protrusions 21 of each pair on the shorter sides are arranged adjacent to each other in a lateral direction. Each protrusion 21 has a substantially rectangular shape when viewed in plan, and a rear sidewall surface of each protrusion 21 serves as a rear latching surface 21b for latching a corresponding one of the engaging portions 13 of the front frame 10. Moreover, a guide portion 22 is provided on the front side of each protrusion 21, where each guide portion 22 is tapered laterally inward from its rearward portion to a ridgeline portion between the front and side faces of the intermediate frame 20. When pressing the front frame 10 so that the engaging portions 13 of the front frame 10 slide over the protrusions 21 to the respective positions where the engaging portions 13 are latched by the protrusions 21, the guide portions 22 function to elastically deform the side face portion 12 of the front frame 10 in the laterally outward direction in which the engaging portions 13 are displaced, according to the amount by which the front frame 10 is moved. Each protrusion 21 has a substantially flat top surface.

Moreover, the front frame 10 has a plurality of openings 14 as cutouts, where the openings 14 are provided by cutting out a part of the side face portion 12 of the front frame 10 so as to expose the plurality of protrusions 21 laterally outward, and each of the plurality of engaging portions 13 and each of the plurality of latching portions 15 are formed by a part of an opening edge of a corresponding one of the plurality of openings 14. The front frame 10 has two longer sides and two shorter sides, and the plurality of latching portions 15 and the plurality of openings 14 are provided so that four latching portions 15 and four openings 14 are positioned on each longer side, and two latching portions 15 and two openings 14 are positioned on each shorter side. That is, one latching portion 15 and one opening 14 are provided for each pair of protrusions 21 of the intermediate frame 20. On the other hand, the plurality of engaging portions 13 are provided so that eight engaging portions 13 are positioned on each longer side, and four engaging portions 13 are positioned on each shorter side. That is, two engaging portions 13 are provided for each pair of protrusions 21.

Each opening 14 of the front frame 10 has a substantially rectangular shape, which has a larger dimension in a direction in which the side of the opening 14 corresponding to the protrusions 21 extends (hereinafter referred to as the "side direction"), than in a lateral direction. The dimension of each opening 14 in the side direction is slightly larger than the dimension between the respective outer wall surfaces of each pair of protrusions 21 in the side direction. Of two (front and rear) opening edges of each opening 14, the front opening edge is positioned in a ridgeline portion between the front face portion 11 and the side face portion 12 of the front frame 10. On the other hand, the rear opening edge is disposed so as to be positioned at a location where the rear opening edge is latched by the rear latching surfaces 21b of a corresponding pair of protrusions 21, when the front frame 10 is properly attached to the intermediate frame 20. Both end portions of the rear opening edge in the side direction form two engaging portions 13, respectively. That is, each opening 14 has a pair of engaging portions 13 corresponding to a respective pair of protrusions 21. An intermediate portion of the rear opening edge in the side direction, which is located between the two engaging portions 13, forms a latching portion 15. In this case, two cuts 15a are respectively made on both sides of each latching portion 15 in the side direction, that is, between each latching portion 15 and the two engaging portions 13 located on both sides thereof, so as to extend rearward from the opening edge. Thus, a portion including the latching portion 15 is shaped like a tongue piece that is tilted along the cuts 15a so that its latching portion 15 side is displaced laterally outward.

The rear frame 30 has a plurality of openings 34 as cutouts, which are provided by cutting out a part of the side face portion 32 of the rear frame 30 so as to expose the plurality of latching portions 15 laterally outward. Each of the plurality of engaging portions 33 is formed by a part of an opening edge of a corresponding one of the plurality of openings 34. The rear frame 30 has two longer sides and two shorter sides, where the plurality of openings 34 and the plurality of engaging portions 33 are provided so that four openings 34 and four engaging portions 33 are positioned on each of the two longer sides, and two openings 34 and two engaging portions 34 are positioned on each of the two shorter sides. The openings 34 have a substantially rectangular shape, which has a larger dimension in the side direction than in the lateral direction. The dimension of each opening 34 in the lateral direction is substantially the same as that in the case of the openings 14 of the front frame 10. Of two (front and rear) opening edges of each opening 34, the rear opening edge is positioned in a ridgeline portion between the rear face portion 31 and the side face portion 32 of the rear frame 30. On the other hand, the front opening edge is positioned at a location where the front opening edge substantially overlaps the rear opening edge of a corresponding one of the openings 14 of the front frame 10, when the rear frame 30 is properly attached to the intermediate frame 20. An intermediate portion of the front opening edge in the side direction forms an engaging portion 33. Two cuts 33a, extending in the forward direction, are respectively made on both sides of each engaging portion 33 in the side direction. Thus, a portion including the engaging portion 33 is shaped like a tongue piece that is tilted along the cuts 33a so that its engaging portion 33 side is displaced laterally inward.

An assembly operation of the frame structure in the LCD device configured as described above will be described below.

The front frame 10 is positioned in front of the intermediate frame 20. With the side face portion 12 facing the intermediate frame 20, the front frame 10 is moved closer to the intermediate frame 20. By pressing the front frame 10 rearward so that the side face portion 12 of the front frame 10 overlaps the side face of the intermediate frame 20, the side face portion 12 of the front frame 10 corresponding to the protrusions 21 moves rearward while being elastically deformed so that the engaging portions 13 respectively slide onto the protrusions 21 and are displaced laterally outward. After the engaging portions 13 slide over the respective protrusions 21, the side face portion 12 is elastically restored to its original shape, and the engaging portions 13 are displaced laterally inward. Thus, each engaging portion 13 of the front frame 10 is positioned at a location where the engaging portion 13 is latched by the rear latching surface 21b of a corresponding one of the protrusions 21, whereby the front frame 10 can be smoothly attached to the intermediate frame 20 with a small pressing force.

Then, the rear frame 30 is positioned behind the intermediate frame 20. With the side face portion 32 facing the intermediate frame 20, the rear frame 30 is moved closer to the intermediate frame 20. Then, by pressing the rear frame 30 so that the side face portion 32 of the rear frame 30 overlaps the side face portion 12 of the front frame 10, the side face portion 32 of the rear frame 30 moves forward while being elastically deformed so that the engaging portions 33 respectively slide onto the tongue piece-shaped portions including the latching portions 15 in the front frame 10, and are displaced laterally outward. After the engaging portions 33 slide over the latching portions 15, respectively, the side face portion 32 is elastically restored to its original shape, and the engaging portions 33 are displaced laterally inward. Thus, each engaging portion 33 of the rear frame 30 is positioned at a location where the engaging portion 33 is latched by a corresponding one of the latching portions 15, whereby the rear frame 30 can be smoothly attached to the intermediate frame 20 via the front frame 10 with a small pressing force.

Thus, according to the present embodiment, an LCD device is configured to accommodate an LCD module in a frame structure, where the frame structure includes: the intermediate frame 20; the front frame 10 positioned so that the front face portion 11 and the side face portion 12 respectively overlap the front and side faces of the intermediate frame 20, and attached to the intermediate frame 20; and the rear frame 30 positioned so that the rear face portion 31 and the side face portion 32 respectively overlap the rear and side faces of the intermediate frame 20, and attached to the intermediate frame 20. In this frame structure, the side face portion 12 of the front frame 10 is provided so as to be positioned laterally inside the side face portion 32 of the rear frame 30, the plurality of protrusions 21 are provided on the side face of the intermediate frame 20 so as to protrude laterally outward, and the plurality of engaging portions 13, which are respectively latched by the rear latching surfaces 21b of the plurality of protrusions 21, and the plurality of latching portions 15 are provided in the side face portion 12 of the front frame 10, whereby the front frame 10 is attached to the intermediate frame 20 by latching the plurality of engaging portions 13 by the plurality of protrusions 21, respectively. On the other hand, the plurality of engaging portions 33, which are respectively latched by the plurality of latching portions 15, are provided in the side face portion 32 of the rear frame 30, whereby the rear frame 30 is attached to the intermediate frame 20 via the front frame 10 by latching the plurality of engaging portions 33 by the plurality of latching portions 15, respectively. Thus, the strength of both the front frame 10 and the rear frame 30 can be increased as compared to the case where the side face portions do not overlap each other as in conventional examples. This can contribute to an increase in strength as a frame structure, and in addition, the side face portion 32 of the rear frame 30 can restrict the movement of the engaging portions 13 of the front frame 10 in the direction in which the engaging portions 13 are removed from the respective protrusions 21. This prevents the front frame 10 from being easily removed from the intermediate frame 20 when, e.g., subjected to an impact force when dropped, whereby a function to protect the LCD module can be enhanced.

Note that, although a total of twelve pairs of protrusions 21 are provided on two longer sides and two shorter sides of the intermediate frame 20 in the above embodiment, the positions of the protrusions 21 and the number of protrusions 21 can be determined appropriately as required.

Although the openings 14, 34 are respectively formed in the side face portion 12 of the front frame 10 and the side face portion 32 of the rear frame 30 in the above embodiment, cutouts may be formed by cutting out a part of each side face portion 12, 32.

Although the above embodiment is described with respect to the case where the side face portion 12 of the front frame 10 is positioned laterally inside the side face portion 32 of the rear frame 30, the present invention is also applicable to the case where the side face portion 32 of the rear frame 30 is positioned laterally inside the side surface portion 12 of the front frame 10. It should be noted that, in this case, the front frame 10 and the rear frame 30 are attached to the intermediate frame 20 in reverse order, and latching portions for respectively latching the engaging portions 13 of the front frame 10 are provided in the rear frame 30, instead of providing, in the front frame 10, the latching portions 15 for respectively latching the engaging portions 33 of the rear frame 30.

Moreover, although the above first and second embodiments are described with respect to an LCD device configured to accommodate an LCD module in a frame structure, the present invention is applicable to frame structures for various apparatuses including other types of display devices.

The invention claimed is:

1. A frame structure, comprising:
an intermediate frame;
a front frame having a front face portion and a side face portion, which are provided so as to be positioned on front and side face sides of the intermediate frame, respectively, where the front frame is attached to the intermediate frame such that the front face portion and the side face portion are positioned on the front and side face sides of the intermediate frame, respectively; and
a rear frame having a rear face portion and a side face portion, which are provided so as to be positioned on rear and side face sides of the intermediate frame, respectively, where the rear frame is attached to the intermediate frame such that the rear face portion and the side face portion are positioned on the rear and side face sides of the intermediate frame, respectively, wherein
the front frame and the rear frame are provided so that the respective side face portions thereof overlap each other,
the intermediate frame has a plurality of protrusions, which are provided on a side face of the intermediate frame so as to protrude laterally outward,
of the front frame and the rear frame, a frame, whose side face portion is positioned on a laterally inner side, has a plurality of engaging portions, which are provided in the side face portion of the frame so as to be latched by the plurality of protrusions, respectively, where the frame is attached to the intermediate frame by latching the plurality of engaging portions by the plurality of protrusions, respectively,
of the front frame and the rear frame, a frame, whose side face portion is positioned on a laterally outer side, has a plurality of engaging portions, which are provided in the side face portion of the frame so as to be latched by the plurality of protrusions, respectively, where the frame is attached to the intermediate frame by latching the plurality of engaging portions by the plurality of protrusions, respectively,
the frame, whose side face portion is located on the laterally inner side, has a plurality of cutouts, which are provided by cutting out a part of the side face portion of the frame so as to expose the plurality of protrusions laterally outward, respectively,
each of the plurality of engaging portions of the frame, whose side face portion is located on the laterally inner side, is formed by a part of a cutout edge of a corresponding one of the plurality of cutouts,
the plurality of engaging portions of the frame, whose side face portion is located on the laterally outer side, are latched by the protrusions via the plurality of cutouts, respectively, and
the plurality of engaging portions of the frame, whose side face portion is located on the laterally outer side, engage with the protrusions in a position inside the side face portion.

2. A frame structure, comprising:
an intermediate frame;
a front frame having a front face portion and a side face portion, which are provided so as to be positioned on front and side face sides of the intermediate frame, respectively, where the front frame is attached to the intermediate frame such that the front face portion and the side face portion are positioned on the front and side face sides of the intermediate frame, respectively; and
a rear frame having a rear face portion and a side face portion, which are provided so as to be positioned on rear and side face sides of the intermediate frame, where the rear frame is attached to the intermediate frame such that the rear face portion and the side face portion are positioned on the rear and side face sides of the intermediate frame, respectively, wherein
the front frame and the rear frame are provided so that the respective side face portions thereof overlap each other,
the intermediate frame has a plurality of protrusions, which are provided on a side face of the intermediate frame so as to protrude laterally outward,
of the front frame and the rear frame, a frame, whose side face portion is positioned on a laterally inner side, has a plurality of engaging portions, which are provided in the side face portion of the frame so as to be latched by the plurality of protrusions, respectively, and a plurality of latching portions provided in the side face portion of the frame, where the frame is attached to the intermediate frame by latching the plurality of engaging portions by the plurality of protrusions, respectively, and
of the front frame and the rear frame, a frame, whose side face portion is positioned on a laterally outer side, has a plurality of engaging portions, which are provided in the side face portion of the frame so as to be latched by the plurality of latching portions, respectively, where the frame is attached to the intermediate frame via the frame, whose side face portion is positioned on the laterally inner side, by latching the plurality of engaging portions by the plurality of latching portions, respectively.

3. The frame structure of claim 2, wherein
the frame, whose side face portion is positioned on the laterally inner side, has a plurality of cutouts provided by cutting out a part of the side face portion of the frame so as to expose the plurality of protrusions laterally outward, respectively, and
each of the plurality of engaging portions and the plurality of latching portions of the frame, whose side face portion is located on the laterally inner side, is formed by a part of a cutout edge of a corresponding one of the plurality of cutouts.

4. A display device comprising:
the frame structure of claim 1; and
a display panel supported by the intermediate frame of the frame structure, for displaying visual information, wherein
the front face portion of the front frame is formed so as to cover a periphery of a display area in the display panel.

5. The display device of claim 4, wherein the display panel is a liquid crystal display panel having a pair of transparent substrates, and a liquid crystal layer interposed between the pair of transparent substrates.

6. A display device comprising:
the frame structure of claims 1; and
a display panel supported by the intermediate frame of the frame structure, for displaying visual information, wherein
the front face portion of the front frame is formed so as to cover a periphery of a display area in the display panel.

7. A display device comprising:
the frame structure of claim 2; and
a display panel supported by the intermediate frame of the frame structure, for displaying visual information, wherein
the front face portion of the front frame is formed so as to cover a periphery of a display area in the display panel.

8. A display device comprising:
the frame structure of claim 3; and
a display panel supported by the intermediate frame of the frame structure, for displaying visual information, wherein
the front face portion of the front frame is formed so as to cover a periphery of a display area in the display panel.

* * * * *